United States Patent
Chen-Quee et al.

(10) Patent No.: US 9,449,184 B2
(45) Date of Patent: Sep. 20, 2016

(54) TIME BASED ACCESS CONTROL IN SOCIAL SOFTWARE

(75) Inventors: Mark Chen-Quee, Tarrytown, NY (US); John W. Eckhart, Boca Raton, FL (US); Heather A. Smith, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 13/026,577

(22) Filed: Feb. 14, 2011

(65) Prior Publication Data
US 2012/0209999 A1 Aug. 16, 2012

(51) Int. Cl.
*G06F 15/173* (2006.01)
*G06F 21/62* (2013.01)

(52) U.S. Cl.
CPC ... *G06F 21/6218* (2013.01); *G06F 2221/2137* (2013.01); *G06F 2221/2151* (2013.01)

(58) Field of Classification Search
USPC ........................................................ 709/217
See application file for complete search history.

(56) References Cited

U.S. PATENT DOCUMENTS

| | | | |
|---|---|---|---|
| 7,478,094 B2 | 1/2009 | Ho et al. | |
| 7,702,693 B1 | 4/2010 | Aiyagari et al. | |
| 2007/0067334 A1 | 3/2007 | Durbin | |
| 2008/0167015 A1 | 7/2008 | Vishwanathan et al. | |
| 2008/0240379 A1 | 10/2008 | Maislos et al. | |
| 2009/0024710 A1 | 1/2009 | Danker et al. | |
| 2009/0029674 A1 | 1/2009 | Brezina et al. | |
| 2009/0030985 A1* | 1/2009 | Yuan ............................ | 709/204 |
| 2009/0086720 A1 | 4/2009 | Westlake | |
| 2009/0113342 A1 | 4/2009 | Bank et al. | |
| 2009/0136013 A1 | 5/2009 | Kuykendall et al. | |
| 2009/0144139 A1* | 6/2009 | Gaedcke ......................... | 705/14 |
| 2009/0203973 A1* | 8/2009 | Donoghue et al. ............ | 600/301 |
| 2009/0228486 A1 | 9/2009 | Kuehr-McLaren et al. | |

(Continued)

FOREIGN PATENT DOCUMENTS

| | | |
|---|---|---|
| EP | 2073517 A1 | 6/2009 |
| WO | WO 2009076755 A1 | 6/2009 |
| WO | WO 2010001182 A2 | 1/2010 |

OTHER PUBLICATIONS

Eagle, N., et al., "Social Serendipity: Mobilizing Social Software," Pervasive Computing, IEEE, 2005.

(Continued)

*Primary Examiner* — Kevin Bates
*Assistant Examiner* — Ronak Patel
(74) *Attorney, Agent, or Firm* — Cahn & Samuels, LLP

(57) ABSTRACT

An embodiment of the invention provides a method for controlling access to content in a social networking website, wherein a connection is established between a first user and a second user on the social networking website. Content on the profile pages of the first user is categorized into a first content category and a second content category. The first content category includes content created before the connection between the first user and the second user was established. The second content category includes content created after the connection between the first user and the second user was established. Content in the first content category is also categorized into a first subcategory and at least one second subcategory. Access by the second user is restricted to the first content category. Specifically, the second user is prevented from viewing content in the first subcategory and permitted to view content in the second subcategory.

25 Claims, 2 Drawing Sheets

(56) References Cited

U.S. PATENT DOCUMENTS

| | | | |
|---|---|---|---|
| 2009/0285372 A1 | 11/2009 | Barton et al. | |
| 2009/0288150 A1 | 11/2009 | Toomim et al. | |
| 2009/0313295 A1* | 12/2009 | Blaxland et al. | 707/103 R |
| 2010/0088340 A1 | 4/2010 | Muller et al. | |
| 2010/0235886 A1 | 9/2010 | Muller et al. | |
| 2011/0078437 A1* | 3/2011 | Reddy | 713/155 |
| 2011/0125661 A1* | 5/2011 | Hull et al. | 705/319 |
| 2012/0042013 A1* | 2/2012 | Roman et al. | 709/204 |

OTHER PUBLICATIONS

Ilarri, S, et al., "Location-Dependent Query Processing: Where We Are and Where We Are Heading", ACM Computing Surveys, vol. 42, No. 3, Article 12, Mar. 2010.

Massaguer, D., et al., "Middleware for Pervasive Spaces: Balancing Privacy and Utility," 2009.

Melinger, D., "Privacy's Role in Mobile Social Software for the Urban Community," 1999-2000.

Puttaswamy, K., et al., "Preserving Privacy in Location-based Mobile Social Applications," HotMobile 2010, Feb. 22-23, 2010.

Shehab, et al., "Beyond User-to-User Access Control for Online Social Networks," ICICS 2008, LNCS 5308, pp. 174-189, 2008.

Change User Status, Parrot-IM Help, http://sites.google.com/site/parrotimhelp/index/how-to-log-in/how-to-chat/how-toexit-sign-out/how-to-save-conversation/change-user-status.

Help Us Nail Spammers, Twitter Blog, http://blog.twitter.com/2009/10/help-us-nail-spammers.html.

Trust and Safety, Twitter Blog, http://blog.twitter.com/2010/03/trust-and-safety.html.

Notification of Transmittal of the International Search Report and the Written Opinion of the International Searching Authority, or the Declaration, PCT Application No. PCT/US2012/024964, dated May 30, 2012.

* cited by examiner

TIME BASED ACCESS CONTROL IN SOCIAL SOFTWARE

BACKGROUND

The present invention is in the field of methods, systems, and computer program products for time based access control in social software.

The World Wide Web provides access to numerous social and business web applications (e.g., FACEBOOK®, MYSPACE®). Modern technological advances have made the Internet more accessible, at faster connection speeds. As a result, such web applications have become an increasingly popular means for people to communicate with their friends, family, and colleagues. For example, members of social networking sites are able to stay in touch with their friends and family by sharing and receiving photographs, videos, wall posts, comments and status updates.

SUMMARY OF THE INVENTION

An embodiment of the invention includes methods, systems, and computer program products for providing time based access control in social software. More specifically, a system and method for controlling access to content in a social networking website includes a connection module for establishing a connection between a first user and a second user on the social networking website, wherein the social networking website includes profile pages of the first user.

Content on the profile pages of the first user is categorized by a processor into a first content category and a second content category. The first content category includes content created before the connection between the first user and the second user was established. The second content category includes content created after the connection between the first user and the second user was established.

The processor also categorizes content in the first content category into a first subcategory and at least one second subcategory. An access controller restricts access by the second user to the first content category. Specifically, the access controller prevents the second user from viewing content in the first subcategory and permits the second user to view content in the second subcategory.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention includes methods, systems, and computer program products for time-based access control in social software, including social networking websites (e.g., FACEBOOK®). As used herein, social networking websites includes websites having the concept of identity and the ability to accept or reject identities into or out of a user's network. Such websites allows users to post content of any kind and may also automatically detect networks based on a data source. For example, the data source may identify relationships such as the position of an identity within the structure of a personal directory. Another identified relationship includes the identity on any system that allows users to post information of any kind whether it be fully public or private (inclusive of any possible content type). In the case of a private content system (e.g., e-mail, private forums) subject matter and identity data is surfaced for the consumption by a social networking website.

In at least one embodiment, content on the social networking websites (e.g., photographs, videos, wall posts, status updates, comments, user profile) is restricted to a contact (also referred to herein as the "remote user" or "second user") based on when the contact relationship was formed in the network. For example, content posted on a user's social networking website before the contact was added to the network is inaccessible by the contact.

In at least one embodiment, time based access control lists (ACL's) are employed that degrade access to the content over time, so that as content ages it becomes available to less people. The distance (number of hops) between one user and another is a factor in this half-life, as well as the number of shared connections between the two users.

Content on the social networking website is tagged with a time stamp at the time that the content is published/posted. In addition, a timestamp is stored when the user sends a friend request and accepts a friend request, wherein the timestamps are accessed each time content is presented to the remote user. In at least one embodiment, the user is given the option to suppress content on the web pages of his or her social networking website that were posted before the friend connection was established. In another embodiment, the user is able to select one or more content categories (e.g., photographs, wall posts, status updates) that may be viewed by the remote user.

Figure 1:
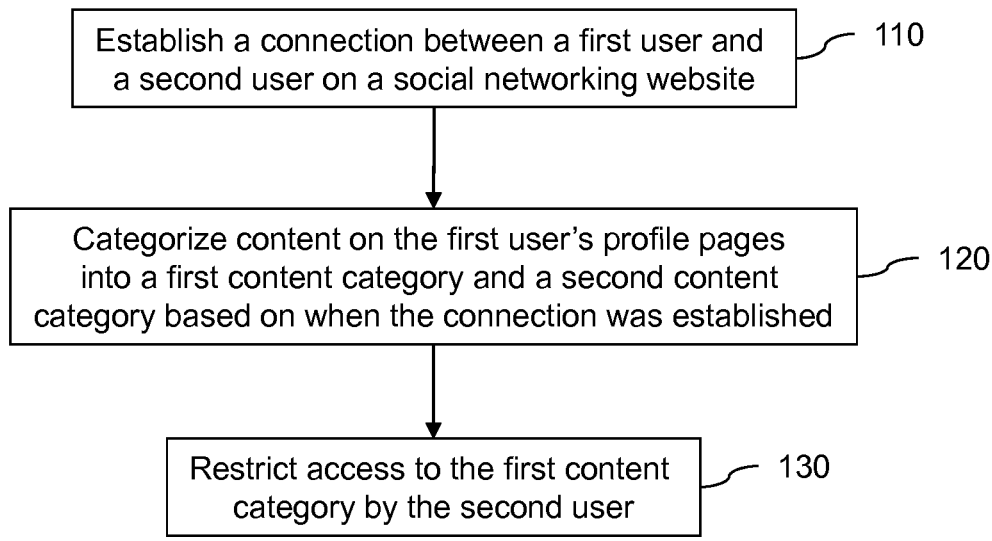
FIG. 1 is a flow diagram illustrating a method for controlling access to content in a social networking website according to an embodiment of the invention.
Figure 2:
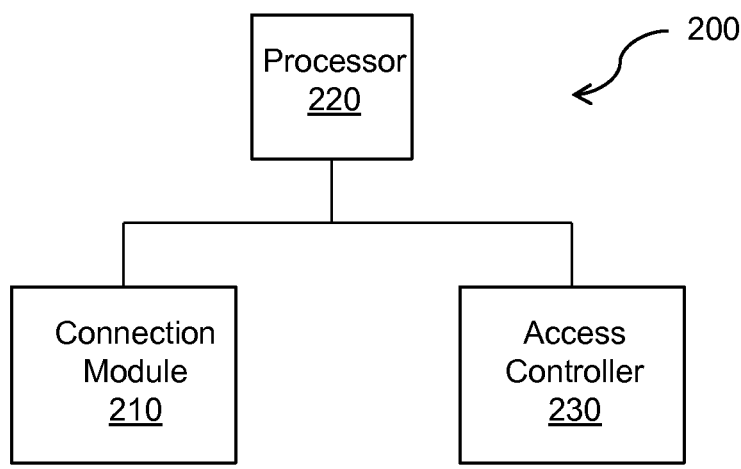
FIG. 2 illustrates a system for controlling access to content in a social networking website according to an embodiment of the invention.

FIG. 1 is a flow diagram illustrating a method for controlling access to content in a social networking website according to an embodiment of the invention. A connection is established between a first user and a second user (also referred to herein as the "contact" or "remote user") on the social networking website 110. As illustrated in FIG. 2, the connection is established by a connection module 210 of the social networking website. The social networking website includes profile pages of the first user, e.g., photographs, videos, wall, profile information, friends list, and group affiliations. For example, the second user sends a friend request to the first user's social network, the first user accepts the friend request, and both users are able to see each other's profile pages.

Content on the first user's profile pages are grouped into a first content category and a second content category 120 by a processor 220 of the social networking website. The first content category includes content created (e.g., posted, published) before the connection between the first user and the second user was established. The second content category includes content created after the connection between the first user and the second user was established. As described above, content is categorized based on timestamps tagged to the content.

Access to the first content category by the second user is restricted 130 by an access controller 230 of the social networking website. Thus, the second user is prevented from viewing content on the first user's profile pages that was created before the connection between the first user and the second user was established.

In at least one embodiment of the invention, content in the first content category if further categorized into a first subcategory and at least one second subcategory, wherein the at least one second subcategory includes acceptable content that may be viewed by the second user. Thus, the second user is prevented from viewing content in the first subcategory, but permitted to view content in the at least one second subcategory.

The acceptable content in the at least one second subcategory is defined by first user or default settings managed by the social networking website. In at least one embodiment, acceptable content includes: all content created by users that belong to a select network (e.g., all users that belong to the first user's geographic network), all content created by one or more select users (e.g., the first user specifies that all content generated by John, Bob, Mary, and Sarah is acceptable), and/or all content created by users having a connection with the second user (e.g, the second user can view content generated by John Smith if the second user is friends with John Smith, or is a friend of a friend of John Smith). The "select" content is defined by the first user and/or default settings of the social networking website. Other acceptable content includes: select profile information defined by the first user and/or a default setting (e.g., favorite movies, books, and quotes are acceptable content), select photographs, select photograph comments, select videos, select video comments, select status updates, select status update comments, select wall posts, and/or select wall post comments. As used herein, "wall posts" include posts to a wall that are generated by a user (e.g., Bill writes "Happy Birthday!" on Bob's wall) and posts to a wall that are automatically generated by the social networking website (e.g., the social networking website automatically posts "John is now friends with Jane", "John likes Jane's status", and "John commented on Jane's photo" on John's wall).

In at least one embodiment of the invention, an expiration date for published content is established, wherein content is inaccessible by remote users after the expiration date. In one embodiment, if the second user's access to content has expired due to time decay, the second user can send a request to the first user to regain access to content (e.g., specific items or categories).

In at least one embodiment, content on the first user's profile pages are tagged with a time stamp that indicates the date and time that the content was published. The expiration date is based on the time stamp (e.g., a status update posted on Jul. 4, 2010 at 2:00 p.m. expires on Jul. 4, 2011 at 2:00 p.m.). In one embodiment, different categories of content (e.g., wall posts, status updates, profile information) have different time periods before expiration.

In another embodiment, the expiration date is based on the number of connections shared between the first user and the remote user (e.g., content viewed by a remote user having 17 friends in common with the first user expires after content viewed by a remote user only having 1 friend in common with the first user).

In yet another embodiment, the expiration date is based on the number of intermediate connections (hops) between the first user and the remote user. For example, the first user is friends with Alan. Bob is friends with Alan, but is not friends with the first user. Charlie is friends with Bob, but is not friends with Alan or the first user. Thus, Bob has 1 intermediate connection with the first user (i.e., Alan); and, Charlie has 2 intermediate connections with the first user (i.e., Alan and Bob). Content viewed by Charlie expires before content viewed by Bob.

In still another embodiment, the expiration date is based on common tags that the first user has assigned to both the second user as well as content that the first user has posted. For example, the first user places a tag on the second user, but not on a third user. The first user places the same tag on a photograph in the first user's photo album. The photograph expires for the third user before it expires for the second user.

In still yet another embodiment, the expiration date is based on the amount of time that has elapsed since the first user has initiated contact with the remote user. For example, the first user sends a message to the remote user on Jul. 5, 2010 at 3:00 PM. This timestamp could be used in the calculation to set the expiration date of the cessation of access for the remote user to the first user's content.

In still yet another embodiment, the expiration date is based on the amount of time that has elapsed since the first user has interacted with the same content that has also had interaction from the remote user. For example, the first user comments on a photo that was published by Bill. The remote user also comments on the same photo that was published by Bill. The timestamp is established at the point that the second identity (be it by the first user or the remote user) posted the comment to the same content. This timestamp could be used in the calculation to set the expiration date of the cessation of access the first user's content by the remote user. It could also be used in the calculation to set the expiration date of the cessation of access to the remote user's content by the first user.

In still yet another embodiment, the expiration date is based on the amount of time that has elapsed since the first user has interacted with content published by the remote user (e.g., wrote on second user's wall, commented on a status update of the second user). For example, the first user comments on a photo that was published by the remote user. The timestamp is established at this point could be used in the calculation to set the expiration date of the cessation of access the first user's content by the remote user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
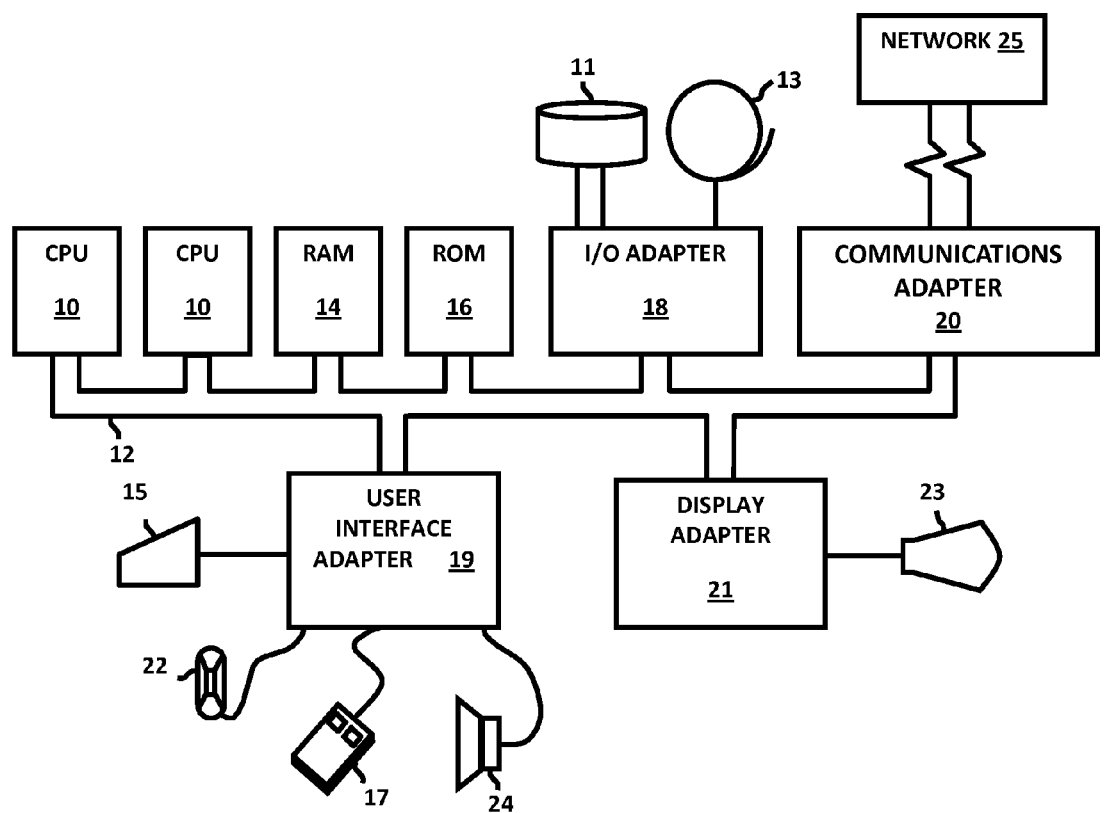
FIG. 3 illustrates a computer program product according to an embodiment of the invention.

Referring now to FIG. 3, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for controlling access to content in a social networking website, said method including:
    establishing a connection between a first user and a second user on the social networking website, the social networking website including profile pages of the first user;
    categorizing content on the profile pages of the first user into a first content category and a second content category,
        the first content category including content created before the connection between the first user and the second user was established, and
        the second content category including content created after the connection between the first user and the second user was established; and
    restricting access by the second user to the first content category.

2. The method according to claim 1, wherein said restricting access to the first content category includes preventing the second user from viewing the content of the first category.

3. The method according to claim 1, further including categorizing content in the first content category into a first subcategory and at least one second subcategory, wherein said restricting access to the first content category includes:
    preventing the second user from viewing content in the first subcategory, and
    permitting the second user to view content in the at least one second subcategory.

4. The method according to claim 3, further including defining acceptable content in the at least one second subcategory, the acceptable content including at least one of:
    all content created by a defined user;
    all content created by users in a defined network;
    all content created by users having a connection with the second;
    select profile information;
    select wall posts;
    select wall post comments;
    select photographs;
    select photograph comments;
    select videos;
    select video comments;
    select status updates; and
    select status update comments.

5. The method according to claim 1, further including establishing an expiration date for the content on the profile pages of the first user, wherein the content on the profile pages of the first user is inaccessible by users having a connection with the first user after the expiration date.

6. The method according to claim 5, further including tagging the content on the profile pages of the first user with a time stamp, the time stamp indicating a date and time that the content was published on the profile pages of the first user, wherein the expiration date is based on the time stamp.

7. The method according to claim 5, wherein the expiration date is based on at least one of:
    a number of connections shared between the first user and the users having a connection with the first user; and
    a number of intermediate connections between the first user and the users having a connection with the first user.

8. The method according to claim 5, wherein the expiration date is based on at least one of:
    an amount of time since a message was last sent from the first user to the second user;
    an amount of time since the first user last interacted with content on profile pages of the second user; and
    an amount of time since the first user last interacted with content also interacted with by the second user.

9. A method for controlling access to content in a social networking website, said method including:
    establishing a connection between a first user and a second user on the social networking website, the social networking website including profile pages of the first user;
    categorizing content on the profile pages of the first user into a first content category and a second content category,
        the first content category including content created before the connection between the first user and the second user was established, and
        the second content category including content created after the connection between the first user and the second user was established;
    categorizing content in the first content category into a first subcategory and at least one second subcategory; and
    restricting access by the second user to the first content category, said restriction of the access including:
        preventing the second user from viewing content in the first subcategory, and
        permitting the second user to view content in the at least one second subcategory.

10. The method according to claim 9, further including defining acceptable content in the at least one second subcategory, the acceptable content including at least one of:
    all content created by a defined user;
    all content created by users in a defined network;
    all content created by users having a connection with the second;
    select profile information;
    select wall posts;
    select wall post comments;
    select photographs;
    select photograph comments;
    select videos;
    select video comments;
    select status updates; and
    select status update comments.

11. The method according to claim 9, further including establishing an expiration date for the content on the profile pages of the first user, wherein the content on the profile pages of the first user is inaccessible by users having a connection with the first user after the expiration date.

12. The method according to claim 11, further including tagging the content on the profile pages of the first user with a time stamp, the time stamp indicating a date and time that the content was published on the profile pages of the first user, wherein the expiration date is based on the time stamp.

13. The method according to claim 11, wherein the expiration date is based on:
  a number of connections shared between the first user and the users having a connection with the first user; and
  a number of intermediate connections between the first user and the users having a connection with the first user.

14. The method according to claim 11, wherein the expiration date is based on:
  an amount of time since a message was last sent from the first user to the second user;
  an amount of time since the first user last interacted with content on profile pages of the second user; and
  an amount of time since the first user last interacted with content also interacted with by the second user.

15. A system for controlling access to content in a social networking website, said system including:
  a connection module for establishing a connection between a first user and a second user on the social networking website, the social networking website including profile pages of the first user;
  a processor connected to said connection module, said processor categorizes content on the profile pages of the first user into a first content category and a second content category,
    the first content category including content created before the connection between the first user and the second user was established, and
    the second content category including content created after the connection between the first user and the second user was established; and
  an access controller connected to said processor, said access controller restricts access by the second user to the first content category.

16. The system according to claim 15, wherein said access controller prevents the second user from viewing the content created before the connection between the first user and the second user was established.

17. The system according to claim 15, wherein said processor categorizes content in the first content category into a first subcategory and at least one second subcategory; and
  wherein said access controller:
    prevents the second user from viewing content in the first subcategory, and
    permits the second user to view content in the at least one second subcategory.

18. The system according to claim 15, wherein the at least one second subcategory includes acceptable content, the acceptable content including at least one of:
  all content created by a defined user;
  all content created by users in a defined network;
  all content created by users having a connection with the second;
  select profile information;
  select wall posts;
  select wall post comments;
  select photographs;
  select photograph comments;
  select videos;
  select video comments;
  select status updates; and
  select status update comments.

19. The system according to claim 15, wherein said access controller establishes an expiration date for the content on the profile pages of the first user, wherein the content on the profile pages of the first user is inaccessible by users having a connection with the first user after the expiration date.

20. The system according to claim 19, wherein said processor tags the content on the profile pages of the first user with a time stamp, the time stamp indicating a date and time that the content was published on the profile pages of the first user, wherein the expiration date is based on the time stamp.

21. The system according to claim 19, wherein the expiration date is based on at least one of:
  a number of connections shared between the first user and the users having a connection with the first user; and
  a number of intermediate connections between the first user and the users having a connection with the first user.

22. The system according to claim 19, wherein the expiration date is based on at least one of:
  an amount of time since a message was last sent from the first user to the second user;
  an amount of time since the first user last interacted with content on profile pages of the second user; and
  an amount of time since the first user last interacted with content also interacted with by the second user.

23. A computer program product for controlling access to content in a social networking website, said computer program product including:
  a non-transitory computer readable storage medium;
  first program instructions to establish a connection between a first user and a second user on the social networking website, the social networking website including profile pages of the first user;
  second program instructions to categorize content on the profile pages of the first user into a first content category and a second content category,
    the first content category including content created before the connection between the first user and the second user was established, and
    the second content category including content created after the connection between the first user and the second user was established; and
  third program instructions to restrict access by the second user to the first content category,
  said first program instructions, said second program instructions, and said third program instructions are stored on said computer readable storage medium.

24. The computer program product according to claim 23, further including fourth program instructions to categorize content in the first content category into a first subcategory and at least one second subcategory, wherein said third program instructions:
  prevent the second user from viewing content in the first subcategory, and
  permit the second user to view content in the at least one second subcategory.

25. The computer program product according to claim 23, further including fifth program instructions to establish an expiration date for the content on the profile pages of the first user, wherein the content on the profile pages of the first user is inaccessible by users having a connection with the first user after the expiration date.

* * * * *